United States Patent [19]

Willett

[11] 4,366,487

[45] Dec. 28, 1982

[54] JET PRINTING APPARATUS AND METHOD

[75] Inventor: Allan R. Willett, Ipsden, England

[73] Assignee: Printos B.V. of N.L., Netherlands

[21] Appl. No.: 245,525

[22] Filed: Mar. 19, 1981

[30] Foreign Application Priority Data

Mar. 24, 1980 [GB] United Kingdom ................. 8009864

[51] Int. Cl.[3] ................................ G01D 15/18

[52] U.S. Cl. ................................ 346/1.1; 346/140 R

[58] Field of Search ............ 346/1.1, 140 R, 140 PD, 346/75

[56] References Cited

U.S. PATENT DOCUMENTS

| | | | |
|---|---|---|---|
| 2,609,440 | 9/1952 | Goldsmith | 346/75 X |
| 3,434,865 | 3/1969 | Doquire et al. | 346/75 X |
| 3,823,409 | 7/1974 | Carrell | 346/140 PD |
| 3,864,685 | 2/1975 | Fischbeck | 346/140 PD |
| 4,164,746 | 8/1979 | Anselrode | 346/140 PD |

*Primary Examiner*—G. Z. Rubinson
*Assistant Examiner*—W. J. Brady
*Attorney, Agent, or Firm*—Robert A. Felsman

[57] ABSTRACT

A jet printing apparatus is shown having a reservoir for storing printing medium. A perforate member having at least one surface which is exposed to the printing medium in the reservoir with the ink entering the perforations. A drive motor effects relative movement of the perforate member past a printing station having a fluid jet with a plurality of nozzles. Electrically controlled valves selectively supply air to the nozzles to eject printing medium from the perforate member onto a printing substrate. In one embodiment, the perforate member is a cylindrical mask having spaced columns of perforations which are successively aligned with the fluid jet nozzles at the printing station. In another embodiment, a mesh belt having perforations is moved between the fluid jet nozzles and an orifice plate which has orifices aligned with the nozzles of the fluid jet. Air from selected nozzles ejects ink from the perforations through an aligned orifice opening onto the printing substrate.

12 Claims, 12 Drawing Figures

JET PRINTING APPARATUS AND METHOD

BACKGROUND OF THE INVENTION

This invention relates to jet printing apparatus of the type used to apply a printing medium to a moving substrate and a method for doing the same.

There has for some time existed a need in the packaging arts for a simple and reliable device to label boxes, containers, and the like, which are moving past a printing station on a conveyor. Ink jet printing devices have been used to accomplish this task and typically comprise a plurality of nozzles through which ink can be selectively ejected onto the moving container to produce alpha-numeric characters. Such known devices have generally employed either piezoelectric ejector means associated with each nozzle for ejecting ink or an electrically operated needle valve or plunger for opening and closing each nozzle. In either case, the device employed is relatively complex and can only print larger sized alpha-numeric characters, e.g., characters having a height of from 13 mm to 70 mm.

The height limitation of the characters which can be printed is limited by the size of the nozzle orifice through which ink is ejected and by the size of the valve employed. In prior devices, there was a lower limit to the orifice sizes which could be employed due to the fact that the inks employed tended to clog orifices below a given diameter. Another disadvantage of the devices which selectively meter ink through a valve lies in the fact that the more exotic inks, many of which have desirable printing characteristics, are often incompatible with the valve components. The use of such inks results in destruction or greatly diminished service life of the valve.

SUMMARY OF THE INVENTION

It is, therefore, an object of this invention to provide a device for printing a greater size range of alpha-numeric characters while eliminating the problem of clogged nozzles.

It is another object of this invention to provide a jet printing apparatus which can utilize a wider spectrum of printing inks.

The jet printing apparatus of this invention has a reservoir for storing printing medium. A perforate member having at least one surface which is perforated is exposed to the medium in the reservoir so that the medium can enter the perforations. Means are provided for effecting relative movement of the perforate member past a printing station. Jet means positioned at the printing station eject a gas into the medium contained in the perforations of the perforate member thereby causing printing medium to be deposited onto a printing substrate.

In one embodiment, the reservoir stores printing ink. A cylindrical mask having a series of perforate columns uniformly spaced about the circumference of the cylinder is exposed to the ink in the reservoir so that ink can enter the perforations. A drive motor is provided to effect relative movement of the cylindrical mask past a printing station where the perforate columns are successively aligned with the printing station. A fluid jet positioned at the printing station has a plurality of nozzles which are aligned to correspond with the perforate columns in the cylindrical mask. Gas flow from the fluid jet nozzles ejects ink contained in the perforations onto a printing substrate. A plurality of electrically operated valves placed between a gas source and the fluid jet nozzles are operated from a suitable electrical control circuit to selectively control the output of gas to the nozzles. The drive motor moves the mask at a constant multiple of the substrate speed, thereby aligning the perforate columns and the nozzles for ejecting ink contained in the perforations onto the substrate.

In another embodiment, a reservoir is provided for storing ink. A mesh belt has at least one surface with perforations which are exposed to the ink in the reservoir so that ink can enter the perforations. A drive motor effects relative movement of the mesh belt past a printing station. An orifice plate positioned at the printing station between the mesh belt and the moving substrate has a series of vertically aligned orifices. A fluid jet positioned at the printing station on the side of the mesh belt opposite the orifice plate has a plurality of nozzles aligned to correspond with the orifices in the orifice plate for ejecting ink contained in the perforations through the orifice plate onto the substrate. A plurality of electrically operated valves are provided between a gas source and fluid jet nozzles. Electrical control means connected to the valves selectively control the output of gas to the nozzles.

The jet printing method of this invention involves first providing a reservoir for storing printing medium. In the next step of the method, a perforate member having at least one surface with perforations is passed through the medium in the reservoir so that the medium enters the perforations. The perforate member is then moved relative to the printing station so that the perforations in the perforate member moved in succession past the printing station. A gas jet is then employed at the printing station to eject the medium contained in the perforations onto the printing substrate.

Additional objects, features, and advantages of the invention will be apparent in the following description.

DETAILED DESCRIPTION OF THE INVENTION

Figure 2:
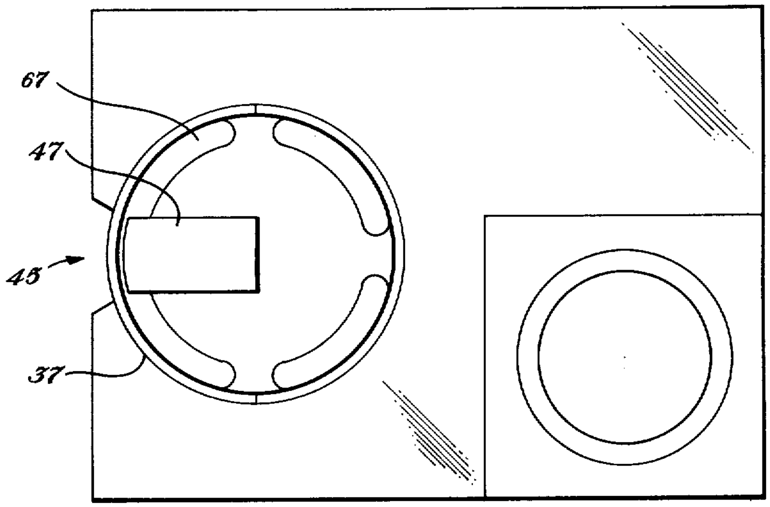
FIG. 2 is a simplified top view of the apparatus of FIG. 1.
Figure 1:
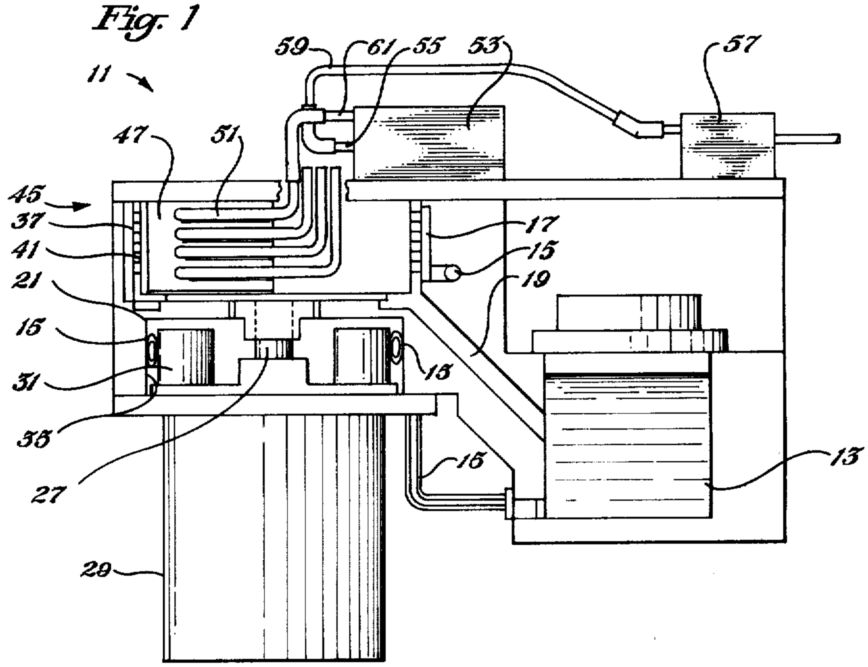
FIG. 1 is a sectional side view of one embodiment of the jet printing apparatus of this invention.

Referring now to FIG. 1, there is shown one embodiment of the jet printing apparatus of this invention. The jet printing apparatus 11 has a printing reservoir for storing printing medium, in this case ink. While the apparatus is primarily intended as an ink jet printing apparatus for printing alpha-numeric characters in ink on a printing substrate, it should be understood that the apparatus can be used in other applications such as for printing adhesive in a required pattern on a surface such as the surface of a label. The apparatus can also be used to apply a suitable adhesive activating agent such as water or a suitable catalyst to a surface previously coated with an adhesive.

Figure 4:
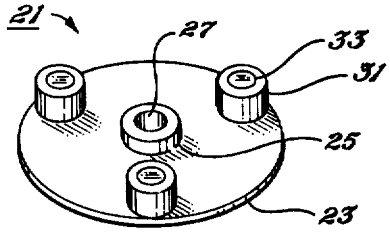
FIG. 4 is an isolated view of the pump of the device of FIG. 1.
Figure 5:
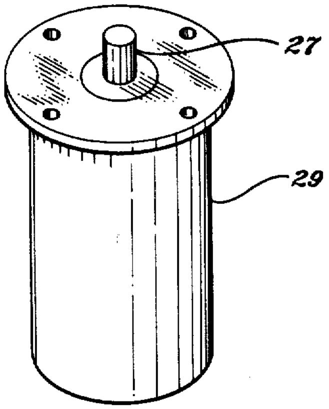
FIG. 5 is an isolated view of the drive motor of the device of FIG. 1.

The printing reservoir includes an ink tank 13 at atmospheric pressure, flexible conduit 15, a delivery plenum 17, and a drain line 19. Supply means such as peristaltic pump 21 ensure that ink from the tank is supplied to the ink delivery plenum 17. As shown in FIG. 4, peristaltic pump 21 comprises a disk or plate 23 having a central aperture 25 adapted to receive the drive shaft 27 of a stepper motor 29. Disk 23 has a plurality of rollers 31 movably mounted on pins 33.

Flexible conduit 15 (FIG. 1) runs from the bottom of tank 13 between rollers 31 and cylindrical sidewalls 35 of peristaltic pump 21 to ink delivery plenum 17. Actuation of stepper motor 29 causes disk 23 to rotate in a counterclockwise direction, causing rollers 31 to squeeze incremental portions of flexible conduit 15 between rollers 31 and sidewalls 35, thus supplying ink to delivery plenum 17.

Figure 3:
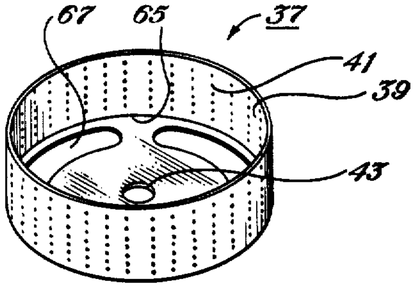
FIG. 3 is an isolated view of the mask of the device of FIG. 1.

A perforate member such as cylindrical mask 37 (FIG. 3) is provided having at least one surface 39 with perforations 41 exposed to the ink reservoir, in this case plenum 17, so that ink can enter the perforations 41. It should be understood that although a cylindrical mask 37 is shown, that the perforate member can be any suitable form such as a rotatable drum or cylinder, an endless band mounted for travel around suitable drive rollers or the like, a tape or band transferable from a supply roll or spool to a take-up roll or spool, a rotatable disk, or a reciprocatable planar member. Whatever form the perforate member takes, at least part of its path of travel is through the reservoir so that one surface of the member will be exposed to the material in the reservoir.

Cylindrical mask 37 also has a centrally located aperture 43 adapted to be mounted on the drive shaft 27 of stepper motor 29 which serves as means for effecting relative movement of cylindrical mask 37 past a printing station 45. Printing station 45 includes at least one fluid jet 47 (FIGS. 1 and 6) having a plurality of nozzles 49 for ejecting the ink contained in perforations 41 on mask 37 onto the printing substrate (not shown).

The perforations in mask 37 are preferably arranged in a series of perforate columns uniformly spaced about the circumference of the cylinder. The perforate columns are thus spaced and aligned normal to the direction of travel of the cylindrical mask 37 with the fluid jet 47 comprising means for ejecting material from each successive perforation or from selected perforations 41. Alternatively, the perforate member can comprise a single row of spaced perforations which are aligned in the direction of travel of the perforate member with the fluid jet 47 adapted either to eject material from each successive perforation or from selected perforations. The perforations in cylindrical mask 37 are preferably in the range of 0.127 to 0.254 mm in diameter. The distance between the center of each perforation when the perforations are vertically aligned is in the range of 0.01 to 5.0 mm and preferably is in the range of 0.05 to 0.50 mm.

It should be understood that the apparatus described can be of either the continuous jet or intermittent jet kind. Thus, where material is ejected from each successive perforation, suitable deflecting means can be provided for directing the material from each perforation either to a required position on a surface to be printed or to a suitable collector for return to the reservoir. Where the material is ejected from selected perforations only, then suitable deflecting means may be provided for directing the ejected material to a required position on a surface to be printed. Preferably, the apparatus is operated in intermittent fashion by selectively controlling fluid jet 47 as will be described.

Figure 6:
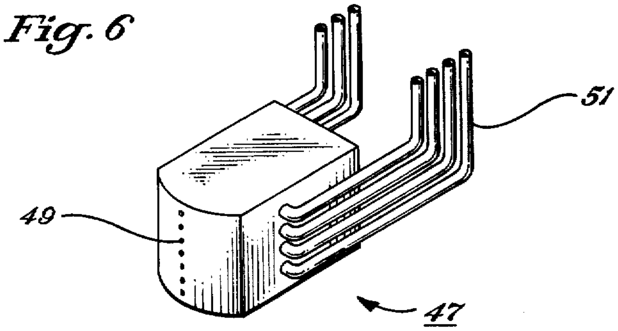
FIG. 6 is an isolated view of the fluid jet of the device of FIG. 1.

Fluid jet 47 as seen in FIG. 6 has a plurality of nozzles 49 for directing a fluid under pressure through the perforations 41 in cylindrical mask 37 when the perforations 41 are aligned with the printing station 45. Each of nozzles 49 is connected by means of a conduit 51 to the output port 61 of a suitable valve means such as solenoid valve 53. Each of solenoid valves 53 has an input port 55 connected to a source of pressurized fluid such as manifold 57 by a fluid line 59. The fluid under pressure is preferably compressed air although other fluids such as suitable gasses or liquids can be used.

An electrical control means of the kind known in the art can be connected to the solenoid valves 53 for selectively controlling the output of gas to the nozzles 49. Stepper motor 29 incrementally advances mask 37 past printing station 45 at a constant multiple of the printing substrate feed, thereby insuring that the perforations 41 in cylindrical mask 37 are sucessively aligned with the nozzles 49 in fluid jet 47. Alternatively, electrical signal generating means such as a digital tachometer or encoder can be associated with the mask 37 and connected to the electrical control means. The signal generating means serve to generate electrical signals indicative of the speed of rotation of the mask 37 and/or the location of the columns of perforations 41 so that operation of the solenoid valves 53 can be coordinated with the rotations of the mask 37.

The inner periphery 65 of cylindrical mask 37 has a gutter 67 for collecting excess ink which is supplied to perforations 41 by plenum 17. The excess ink is returned to tank 13 by means of drain line 19.

Operation of the jet printing apparatus will now be described. Air under pressure is supplied to gas manifold 57 which communicates with the input ports 55 of solenoid valves 53 by means of gas lines 59. The output ports 61 of valves 53 communicate with the nozzles 49 in fluid jet 47 by means of conduits 51. The cylindrical mask 37 is rotated by means of stepper motor 29 so as to bring the perforations 41 in each column on surface 39 successively into alignment with the nozzles 49 of fluid jet 47 at the printing station 45. At the same time, a substrate to be printed (not shown) is moved past the printing station 45 at a predetermined speed and spacing relative to the printing station 45, the direction of movement of the substrate being normal to the direction of alignment of the nozzles 49. Under the control of the electrical control means, the solenoid valves 53 are selectively actuated to supply air to selected nozzles 49 so that air under pressure from source 57 can issue therefrom and eject the drops of ink contained in perforations 41 onto the printing substrate.

The positioning of the drops of ink on the substrate is determined by the direction of alignment of the nozzles 49, by the selective actuation of solenoid valves 53, and in the direction of movement of the substrate relative to the printing station 45. The electrical control means for controlling the operation of the solenoid valves 53 is preferably programmable so that the apparatus can be programmed to print any required alpha-numeric character or sequences of characters in dot-matrix fashion.

Figure 7:
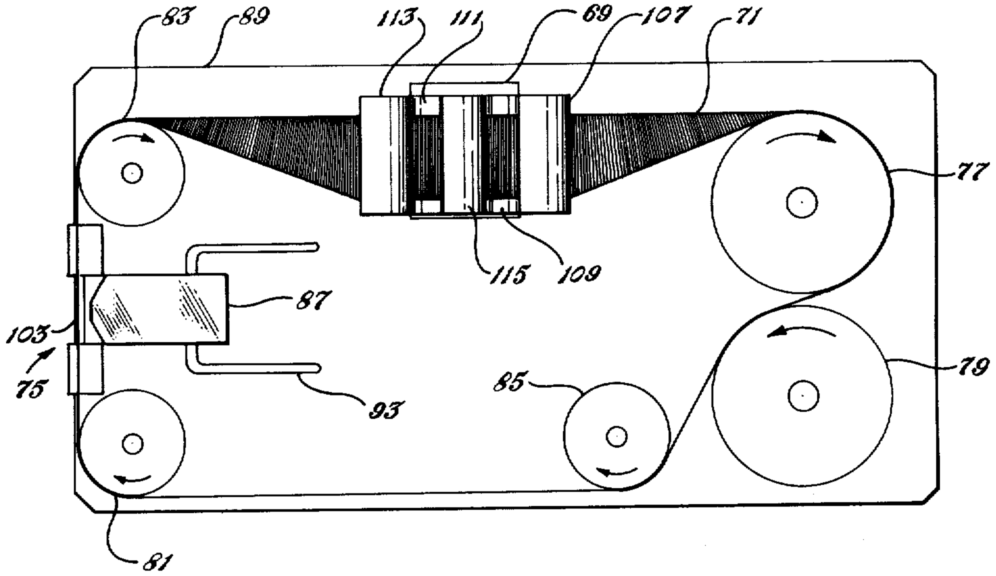
FIG. 7 is a simplified top view of another embodiment of the jet printing apparatus of this invention.
Figure 12:
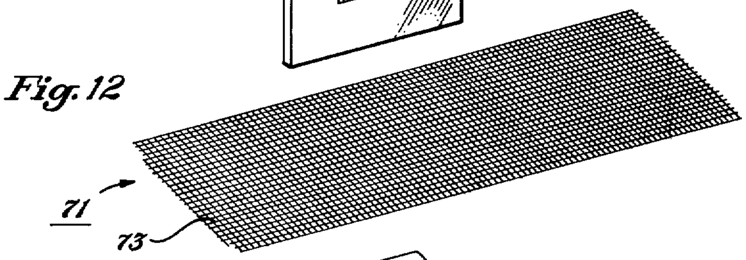
FIG. 12 is an isolated view of a portion of the perforate member of the device of FIG. 7.

Referring now to FIG. 7, there is shown another embodiment of the present invention. In the apparatus of FIG. 7, there is provided a reservoir for storing ink such as tank 69. A perforate member, such as mesh belt 71 (FIG. 12) has at least one surface with perforations 73 exposed to ink in tank 69 so that ink can enter the perforations 73. Belt 71 can be of any suitable material which is compatible with the ink medium such as nylon, stainless steel mesh, or the like.

Figure 8:
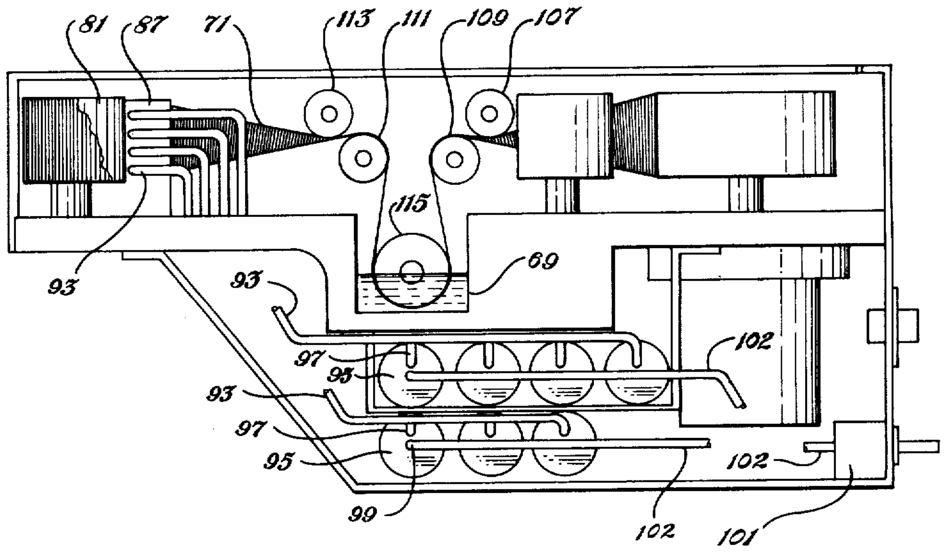
FIG. 8 is a side sectional view of the device of FIG. 7.
Figure 10:
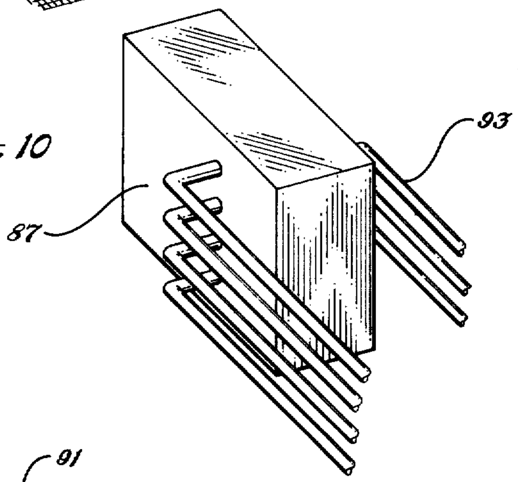
FIG. 10 is an isolated view of the fluid jet of the device of FIG. 7.
Figure 11:
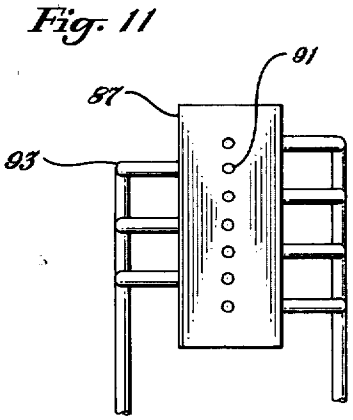
FIG. 11 is a front view of the fluid jet of FIG. 10.

Belt 71 is moved past a printing station 75 by means of drive pulley 77, idler pulleys 79, 81, 83, and belt tensioner pully 85. A fluid jet 87 (FIG. 10) is positioned at the printing station 75 generally between idler pulleys 81, 83 within outer housing 89. Fluid jet 87 has a plurality of nozzles 91 (FIG. 11) each of which communicates by means of a conduit 93 with the output port 97 of a suitable valve such as an electrical solenoid valve 95 (FIG. 8). The input ports 99 of each of valves 95 communicates with a source of pressurized air such as air inlet manifold 101 by means of a suitable conduit 102.

Electrical control means are preferably connected to valves 95 for selectively controlling the output of air to the nozzles 91.

Figure 9:
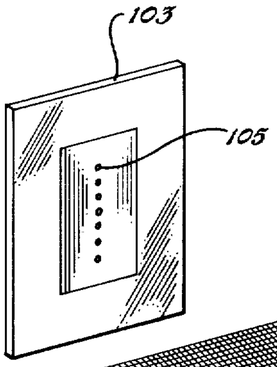
FIG. 9 is an isolated view of the orifice plate of the device of FIG. 7.

An orifice plate 103 (FIG. 9) is positioned at the printing station 75 between the mesh belt 71 and the moving substrate. Orifice plate 103 has a series of orifices 105 vertically aligned to correspond with the nozzles 91 in fluid jet 87. The orifices 105 in orifice plate 103 are preferably in the range of 0.127 mm to 0.254 mm in diameter. The distance between the center of each orifice is in the range of 0.01 to 5.0 mm and preferably is in the range of 0.05 to 0.50 mm.

The operation of the device of FIG. 7 will now be described. Belt 71 is moved past an ink reservoir 69 in a clockwise direction by drive pulley 77 and idler pulleys 79, 81, and 83. A series of translator pulleys 107, 109, 111, 113 (FIG. 8) and a roller 115 translate the orientation of belt 71 ninety degrees to allow the belt 71 to contact the ink in tank 69 and allow ink to enter the perforations 73 before reorienting the belt 71.

Air under pressure is supplied to air inlet manifold 101 which communicates with input ports 99 of solenoid valves 95. The output ports 97 of valves 95 communicate with nozzles 91 in fluid jet 87 by means of conduits 93. Movement of mesh belt 71 in a clockwise direction brings the perforations 73 in belt 71 past the nozzles 91 in fluid jet 87 at printing station 75. The direction of travel of mesh belt 71 is normal to the direction of flow of pressurized air from nozzles 91.

Belt 71 passes between nozzles 91 and stationary orifice plate 103, the orifices in plate 103 being aligned with the nozzles 91 in fluid jet 87. At the same time, a substrate to be printed is moved past the printing station at a predetermined speed and spacing relative to the printing station 75, the direction of movement of the substrate being normal to the direction of alignment of nozzles 91. Under the control of electrical control means, the solenoid valves 95 are selectively actuated to supply air to selected nozzles 91 so that air under pressure from source 101 ejects the drops of ink in perforations 73 of belt 71 onto the printing substrate.

An invention has been shown with significant advantages, a jet printing apparatus has been provided which utilizes gas nozzles to eject ink from a moving perforate member onto a printing substrate. Since ink is carried on the perforate member rather than being supplied through valves and nozzles, smaller air nozzles can be utilized allowing smaller characters to be printed on the substrate. Since the ink is not metered through valves, more exotic inks can be employed.

While the invention has been shown in only two of its forms, it should be apparent to those skilled in the art that it is not so limited but is susceptible to various changes and modifications without departing from the spirit thereof.

I claim:

1. A jet printing apparatus of the type used to apply a printing medium to a moving substrate, comprising:
   - a reservoir for storing printing medium;
   - a perforate member having at least one surface with perforations exposed to said medium in said reservoir so that said medium can enter said perforations;
   - a printing station;
   - means for effecting relative movement of said perforate member past said printing station; and
   - fluid jet means positioned at said printing station for ejecting a gas into said medium contained in said perforations for causing said medium to be deposited onto said substrate.

2. A jet printing apparatus of the type used to apply ink to a moving substrate, comprising:
   - a reservoir for storing ink;
   - a perforate member having at least one surface with perforations exposed to said ink in said reservoir so that ink can enter said perforations;
   - a printing station;
   - means for effecting relative movement of said perforate member past said printing station; and
   - a fluid jet positioned at said printing station, said fluid jet having a plurality of gas nozzles for ejecting a gas into said ink contained in said perforations for causing said ink to be deposited onto said substrate.

3. A jet printing apparatus of the type used to apply ink to a moving substrate, comprising:
   - a reservoir for storing ink;
   - a cylindrical mask having a series of perforate columns uniformly spaced about the circumference thereof, said perforate columns being exposed to said ink in said reservoir so that ink can enter said perforations;
   - a printing station;
   - a drive motor for effecting relative movement of said cylindrical mask past said printing station whereby said perforate columns are successively aligned with said printing station; and
   - a fluid jet positioned at said printing station, said fluid jet having a plurality of gas nozzles aligned to correspond with said perforate columns in said cylindrical mask for ejecting a gas into said ink contained in said perforations for causing said ink to be deposited onto said substrate.

4. A jet printing apparatus of the type used to apply ink to a moving substrate, comprising:
   - a reservoir for storing ink;
   - a cylindrical mask having a series of perforate columns uniformly spaced about the circumference thereof, said perforate columns being exposed to said ink in said reservoir so that ink can enter said perforations;

a printing station;

a drive motor for effecting relative movement of said cylindrical mask past said printing station whereby said perforate columns are successively aligned with said printing station;

a fluid jet positioned at said printing station, said fluid jet having a plurality nozzles aligned to correspond with said perforate columns in said cylindrical mask for ejecting said ink contained in said perforations onto said substrate;

a plurality of electrically operated valves, each of said valves having an input port adapted to receive a gas and an output port in fluid communication with each of said nozzles; and a gas source connected to said input ports.

5. A jet printing apparatus of the type used to apply ink to a moving substrate, comprising:

a reservoir for storing ink;

a cylindrical mask having a series of perforate columns uniformly spaced about the circumference thereof, said perforate columns being exposed to said ink in said reservoir so that ink can enter said perforations;

a printing station;

a drive motor for effecting relative movement of said cylindrical mask past said printing station whereby said perforate columns are successively aligned with said printing station;

a fluid jet positioned at said printing station, said fluid jet having a plurality of nozzles aligned to correspond with said perforate columns in said cylindrical mask for ejecting said ink contained in said perforations onto said substrate;

a plurality of electrically operated valves, each of said valves having an input port adapted to receive a gas and an output port in fluid communication with each of said nozzles;

a gas source connected to said input ports; and wherein said drive motor moves said mask at a constant multiple of said substrate speed, thereby aligning said perforate columns and said nozzles for ejecting said ink contained in said perforations onto said substrate.

6. A jet printing apparatus of the type used to apply ink to a moving substrate, comprising:

a reservoir for storing ink;

a cylindrical mask having a series of perforate columns uniformly spaced about the circumference thereof, said perforate columns being exposed to said ink in said reservoir so that ink can enter said perforations;

a printing station;

a drive motor for effecting relative movement of said cylindrical mask past said printing station whereby said perforate columns are successively aligned with said printing station;

a fluid jet positioned at said printing station, said fluid jet having a plurality of nozzles aligned to correspond with said perforate columns in said cylindrical mask for ejecting said ink contained in said perforations onto said substrate;

a plurality of electrically operated valves, each of said valves having an input port adapted to receive a gas and an output port in fluid communication with each of said nozzles;

a gas source connected to said input ports;

wherein said drive motor moves said mask at a constant multiple of said substrate speed, thereby aligning said perforate columns and said nozzles for ejecting said ink contained in said perforations onto said substrate; and wherein said perforations in said mask are in the range of 0.127 mm to 0.254 mm in diameter.

7. A jet printing apparatus of the type used to apply ink to a moving substrate, comprising:

a reservoir for storing ink;

a cylindrical mask having a series of perforate columns uniformly spaced about the circumference thereof, said perforate columns being exposed to said ink in said reservoir so that ink can enter said perforations;

a printing station;

a drive motor for effecting relative movement of said cylindrical mask past said printing station whereby said perforate columns are successively aligned with said printing station;

a fluid jet positioned at said printing station, said fluid jet having a plurality of nozzles aligned to correspond with said perforate columns in said cylindrical mask for ejecting said ink contained in said perforations onto said substrate;

a plurality of electrically operated valves, each of said valves having an input port adapted to receive a gas and an output port in fluid communication with each of said nozzles;

a gas source connected to said input ports;

wherein said drive motor moves said mask at a constant multiple of said substrate speed, thereby aligning said perforate columns and said nozzles for ejecting said ink contained in said perforations onto said substrate;

wherein said perforations in said mask are in the range of 0.127 mm to 0.254 mm in diameter; and wherein the distance between the centers of said perforations in said mask are in the range of 0.05 to 0.5 mm.

8. A jet printing apparatus of the type used to apply a printing medium to a moving substrate, comprising:

a reservoir for storing ink;

a perforate member having at least one surface with perforations exposed to said ink in said reservoir so that ink can enter said perforations;

a printing station;

means for effecting relative movement of said perforate member past said printing station;

an orifice plate positioned at said printing station between said perforate member and said moving substrate, said orifice plate having a series of orifices; and a fluid jet positioned at said printing station on the side of said perforate member opposite said orifice plate, said fluid jet having at least one nozzle for ejecting ink contained in said perforations through said orifice plate onto said substrate.

9. A jet printing apparatus of the type used to apply a printing medium to a moving substrate, comprising:

a reservoir for storing ink;

a mesh belt having at least one surface with perforations exposed to said ink in said reservoir so that ink can enter said perforations;

a printing station;

a drive motor for effecting relative movement of said mesh belt past said printing station;

an orifice plate positioned at said printing station between said mesh belt and said moving substrate, said orifice plate having a series of vertically aligned orifices; and a fluid jet positioned at said printing station on the side of said mesh belt opposite said orifice plate, said fluid jet having a plurality of nozzles aligned to correspond with said orifices in said orifice plate for ejecting said ink contained in said perforations through said orifice plate onto said substrate.

10. The jet printing apparatus of claim 9, further comprising:

a plurality of electrically operated valves, each of said valves having an input port adapted to receive a gas and an output port in fluid communication with each of said nozzles; and a gas source connected to said input ports.

11. The jet printing apparatus of claim 10, wherein said orifices in said orifice plate are in the range of 0.127 mm to 0.254 mm in diameter.

12. A jet printing method for applying a printing medium to a moving substrate, comprising the steps of:

providing a reservoir for storing printing medium;

passing a perforate member having at least one surface with perforations through said medium in said reservoir so that said medium enters said perforations;

effecting relative movement of said perforate member past a printing station; and employing a gas jet at said printing station to eject said medium contained in said perforations onto said substrate.

* * * * *